(12) United States Patent
Dai et al.

(10) Patent No.: US 7,360,446 B2
(45) Date of Patent: Apr. 22, 2008

(54) CERAMIC OSCILLATION FLOW METER HAVING COFIRED PIEZORESISTIVE SENSORS

(75) Inventors: Steve X. Dai, Gilbert, AZ (US); Stephen R. Samms, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 51 days.

(21) Appl. No.: 11/444,090

(22) Filed: May 31, 2006

(65) Prior Publication Data

US 2007/0295103 A1  Dec. 27, 2007

(51) Int. Cl.
G01F 1/20  (2006.01)
(52) U.S. Cl. ................................. 73/861.19
(58) Field of Classification Search ............. 73/861.19
See application file for complete search history.

(56) References Cited

U.S. PATENT DOCUMENTS

| | | | |
|---|---|---|---|
| 3,185,166 A | | 5/1965 | Horton et al. |
| 3,273,377 A | | 9/1966 | Testerman et al. |
| 3,373,600 A | | 3/1968 | Taplin |
| 3,640,133 A | | 2/1972 | Adams |
| 3,756,068 A | | 9/1973 | Villarroel et al. |
| 4,085,615 A | * | 4/1978 | Haefner et al. .......... 73/861.19 |
| 4,107,990 A | * | 8/1978 | Ringwall ................. 73/861.19 |
| 4,150,561 A | | 4/1979 | Zupanick |
| 4,244,230 A | | 1/1981 | Bauer |
| 4,550,614 A | * | 11/1985 | Herzl ....................... 73/861.19 |
| 4,949,755 A | | 8/1990 | Thurston et al. |
| 5,179,970 A | * | 1/1993 | Jarocki et al. .................. 137/9 |
| 5,339,695 A | * | 8/1994 | Kang et al. .............. 73/861.19 |
| 5,362,987 A | * | 11/1994 | Cassaday et al. ............. 290/54 |
| 6,076,392 A | | 6/2000 | Drzewiecki |
| 6,553,844 B2 | | 4/2003 | Drzewiecki |
| 6,986,649 B2 | | 1/2006 | Dai |
| 7,204,156 B2 | * | 4/2007 | Samms et al. ........... 73/861.19 |
| 2004/0200291 A1 | | 10/2004 | Dai et al. |

* cited by examiner

*Primary Examiner*—Harshad Patel

(57) ABSTRACT

An apparatus is provided for measuring the amount of fluid (21) flowing in a channel (18, 20). The apparatus comprises a fluidic oscillation flow meter (10) including a housing (14) defining an inlet (16) for receiving the fluid (21), and first and second diversion channels (18, 20) for alternately receiving the fluid (21) from the inlet (16). The housing (14) comprises a first nozzle (46) for receiving the fluid (21) from the first diversion channel (18) and deflecting the fluid (21) from the inlet (16) into the second diversion channel (20). A second nozzle (48) receives the fluid (21) from the second diversion channel (20) and alternately deflects the fluid (21) from the inlet (16) into the first diversion channel (18). A first layer of material (56) overlies at least one of the first and second diversion channels (18, 20) and includes a sensing area that distorts due to a pressure change caused by the fluid (21) flowing through the diversion channels (18, 20). A first sensing piezoresistor (62) is positioned on the layer of material (56) near the first diversion channel (18) for detecting the pressure change of the sensing area and generating a frequency signal.

17 Claims, 2 Drawing Sheets

CERAMIC OSCILLATION FLOW METER HAVING COFIRED PIEZORESISTIVE SENSORS

FIELD OF THE INVENTION

The present invention generally relates to an apparatus for measuring the amount of fluid flowing in a channel and more particularly to a fluidic oscillation flow meter for determining the flow rate of a gas.

BACKGROUND OF THE INVENTION

Development of microfluidic technology has generally been driven by parallel ontological advancements in the commercial electronics industry with the ever-increasing demand for sophisticated devices having reduced part counts, weights, form factors and power consumption while improving or otherwise maintaining overall device performance. In particular, advancement of microfluidic technology has met with some success in the areas of packaging and the development of novel architectures directed to achieving many of these aims at relatively low fabrication cost.

The development of microfluidic systems, based on for example, multilayer laminate substrates with highly integrated functionality, have been of particular interest. Monolithic substrates formed from laminated ceramic have been generally shown to provide structures that are relatively inert or otherwise stable to most chemical reactions as well as tolerant to high temperatures. Additionally, monolithic substrates typically provide for miniaturization of device components, thereby improving circuit and/or fluidic channel integration density. Potential applications for integrated microfluidic devices include, for example, fluidic management of a variety of microsystems for life science and portable fuel cell applications. One representative application includes the use of ceramic materials to form microchannels and/or cavities within a laminate structure to define, for example, a fluidic oscillation flow meter.

Conventional micro-flow meters have been used in several applications; however, many of these are generally too cumbersome and complex for application with microfluidic systems. For example, existing designs typically employ numerous discrete components externally assembled or otherwise connected together with plumbing and/or component hardware to produce ad hoc pumping systems. Consequently, conventional designs have generally not been regarded as suitable for integration with portable ceramic technologies or in various applications requiring, for example, reduced form factor, weight or other desired performance and/or fabrication process metrics. Moreover, previous attempts with integrating fluidic oscillation flow meters in laminated substrates have typically met with considerable difficulties in producing reliable fluidic connections and/or hermetic seals capable of withstanding manufacturing processes and/or operational stress while maintaining or otherwise reducing production costs. Accordingly, despite the efforts of prior art flow meter designs to miniaturize and more densely integrate components for use in microfluidic systems, there remains a need for fluidic oscillation flow meters having integrated pressure sensors suitably adapted for incorporation with, for example, a monolithic device package.

Fluidic oscillator flow meters are well known in the art. See for example, Horton et al., U.S. Pat. No. 3,185,166; Testerman et al., U.S. Pat. No. 3,273,377; Taplin, U.S. Pat. No. 3,373,600; Adams et al., U.S. Pat. No. 3,640,133; Villarroel et al., U.S. Pat. No. 3,756,068; Zupanick, U.S. Pat. No. 4,150,561; Bauer, U.S. Pat. No. 4,244,230; and Drzewiecki, U.S. Pat. No. 6,553,844. These conventional fluidic oscillators comprise a fluidic amplifier having two channels with the outputs fed back to the input to produce a free running oscillation wherein the fluid alternatively flows through one channel then the other by means of the fluid fed back being transversely applied to the input stream thereby forcing the input to the other channel.

Most fluidic oscillator flow meters measure some characteristic, e.g., volumetric flow, density, quality, enthalpy, and bulk modulus of a fluid. In the case of measuring volumetric flow, this is typically accomplished by measuring the frequency of the fluid shifting from one channel to the other. The frequency is linearly related to the volumetric flow because the flow transit time is related to flow velocity. Since the amplifier nozzle area is known, the product of velocity and area yields volumetric flow. In most cases, the acoustic feedback time for most fluids can be designed to be only a few percent of the total flow transit time.

In U.S. Pat. No. 6,076,392, the constituents of a gas mixture are determined by measuring both the flow of the fluid sample stream and the speed of sound in the fluid. A measure of the volumetric flow is required to determine the properties density and viscosity of the fluid sample, and a measure of the speed of sound is required to determine the property specific heat of the fluid.

In "A Fluidic-Electronic Hybrid System for Measuring the Composition of Binary Mixtures", Anderson et al., Ind. Eng. Chem. Fundam., Vol. 11, No. 3, 1972, it has been shown that the density of a gas may be determined by use of an oscillation flow meter for gasses with temperatures ranging from −20 to +120° C. The speed of a pressure pulse traveling through a gas (sonic velocity) is proportional to the square root of the gas density.

Samms et al., U.S. patent application Ser. No. 11/192,819, disclosed attaching a piezoelectric unimorph as a sensor for determining the oscillation frequency in a fludic oscillation flow meter. However, it is well known that the operation temperature of piezoelectric sensors is limited by correspondent material Curie Temperature. Dai et al., U.S. Pat. No. 6,986,649, disclosed integrating a piezoresistive sensor next to a pumping chamber of a micropump to detect the pressure. The sensing piezoresistors were disposed on a flex ceramic membrane between a cavity and pumping chamber and reference piezoresistors were formed away from the membrane.

Accordingly, it is desirable to provide a fluidic oscillation flow meter integrated with piezoresistive sensors within a fluidic oscillation flow meter for measuring the oscillation frequency of fluids and calculating the volumetric flow rate of elevated temperature vapor. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for measuring the amount of fluid flowing in a channel. The apparatus comprises a fluidic oscillation flow meter including a housing defining an inlet for receiving a fluid, and first and second diversion channels for alternately receiving the fluid from the inlet. The housing comprises a first nozzle for receiving the fluid from the first diversion channel and deflecting the fluid from the inlet into the second diversion channel. A second nozzle receives the fluid from the second diversion channel and alternately deflects the fluid from the inlet into the first diversion channel. A first layer of material overlies at least one of the first and second diversion channels and includes a sensing area that distorts due to a pressure change caused by the fluid flowing through the diversion channels. A first sensing piezoresistor is positioned on the layer of material near the diversion channels for detecting the pressure change of the sensing area and generating a frequency signal.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
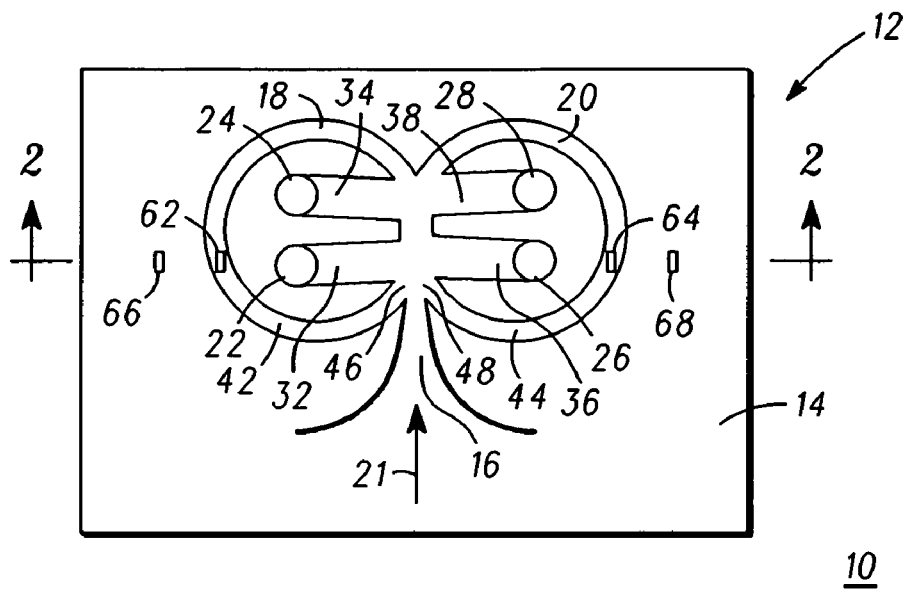
FIG. 1 is a schematic diagram of a fluidic oscillation flow meter in accordance with an exemplary embodiment.

The following detailed description of the invention is merely exemplary in nature and is not intended to limit the invention or the application and uses of the invention. Furthermore, there is no intention to be bound by any theory presented in the preceding background of the invention or the following detailed description of the invention.

Various representative implementations of the present invention may be applied to any system and/or method for fluid transport. As used herein, the terms "fluid", "fluidic" and/or any contextual, variational or combinative referent thereof, are generally intended to include anything that may be regarded as at least being susceptible to characterization as generally referring to a gas, a liquid, a plasma and/or any matter, substance or combination of compounds substantially not in a solid or otherwise effectively immobile condensed phase. As used herein, the terms "inlet" and "outlet" are generally not used interchangeably. For example, "inlet" may generally be understood to comprise any cross-sectional area or component feature of a device, the flux through which tends to translate fluid from a volume element substantially external to the device to a volume element substantially internal to the device; whereas "outlet" may be generally understood as referring to any cross-sectional area or component feature of a device, the flux through which tends to translate fluid from a volume element substantially internal to the device to a volume element substantially external to the device. On the other hand, as used herein, the terms "liquid" and "gas" may generally be used interchangeably and may also be understood to comprise, in generic application, any fluid and/or any translationally mobile phase of matter. As used herein, the term "purged", as well as any contextual or combinative referent or variant thereof, is generally intended to include any method, technique or process for moving a volume element of fluid through the outlet of a device so as to dispose or otherwise positionally locate the "purged" volume element external to the device.

A multilayer ceramic fluid oscillator in accordance with the exemplary embodiment includes integrated piezoresistive pressure sensors. The piezoresistors are formed by depositing, e.g., screen printing, piezoresistive paste and connecting metal conducting paste onto the unfired ceramic sheets that cover vapor/fluid channels. These sheets are stacked and laminated and fired into a monolithic ceramic structure. The piezoresistors and conductor traces are cofired with the entire multilayer ceramic stack. The sensing piezoresistors are positioned adjacent to the channels to detect any deformation of the underneath ceramic membrane due to pressure changes in the channel. The value of the resistors could be directly used to calculate the pressure change. Alternatively, reference resistors may be placed away from the channels. A Wheatstone bridge comprising the two sensing piezoresistors and the two reference resistors would be used in a manner known to those skilled in the art to determine the pressure differential and therefore the fluidic flow within the channels.

Referring to FIG. 1, a fluidic oscillation flow meter 10 in accordance with an exemplary embodiment of the present invention includes a flow meter 12 within a housing 14. The housing 14 comprises a material able to withstand high temperatures, such as a metal, but would preferably comprise ceramic.

The flow meter 12 comprises a flow meter inlet nozzle 16 and first and second diversion channels 18, 20. The fluid 21, preferably a heated, vaporized gas, enters the flow meter inlet nozzle 16 under pressure and with a desired velocity. Vents 22, 24, 26, and 28 (output vias) are accessible through output channels 32, 34, 36, 38.

The fluid 21 enters the flow meter inlet nozzle 16 having a certain velocity. As the gas vapor proceeds into the flow meter 12, a significant portion of the gas vapor will enter either the first or second diversion channel 18, 20. For example, the gas vapor might enter diversion channel 18, and proceed around through first return channel 42, passing through the first nozzle 46. As the gas vapor passes through first nozzle 46, it impacts the gas vapor entering at flow meter inlet nozzle 16, deflecting the entering gas vapor and causing a significant portion of the entering gas vapor to now divert to the second diversion channel 20. The gas vapor would then proceed around through second return channel 44, passing through the second nozzle 48. As the gas vapor passes through second nozzle 48, it impacts the gas vapor entering at flow meter inlet nozzle 16, deflecting the entering gas vapor and causing a significant portion of the entering gas vapor to again enter the first diversion channel 18. This switching from one side of the flow meter 12 to the other will continue in a cyclic fashion having a certain frequency depending on the rate of flow of the gas as long as gas vapor enters the flow meter 12.

As gas vapor fills the flow meter 12 and the pressure builds, gas vapor will enter output channels 32, 34, 36, 38 and exit (purged from) the flow meter 12 through vents 22, 24, 26, 28. The vents 22, 24, 26, 28 may converge into a single outlet (not shown). Additionally, though four vents 22, 24, 26, 28 are shown, any number of vents may be used. Typically, an equal number of vents would be positioned on both sides.

Figure 2:
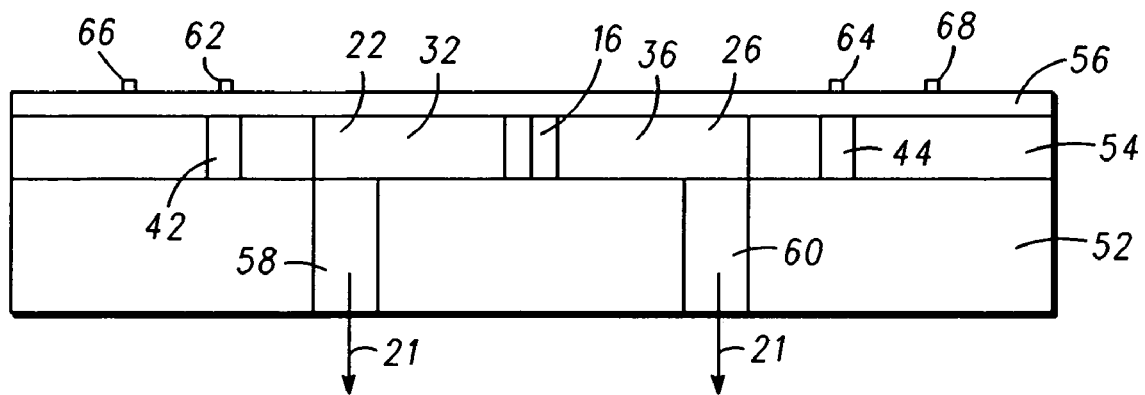
FIG. 2 is a schematic cross section taken along the line 2-2 of FIG. 1.

Referring to FIGS. 1 and 2, wherein FIG. 2 is a cross section of the exemplary embodiment of FIG. 1 taken along line 2-2, the housing 14 comprises a first layer 52, a second layer 54, and a third layer 56, all preferably of a ceramic material. The first layer 52 includes vias 58 and 60 for purging the fluid 21 from vents 22 and 26, respectively. The first layer 52 may be a substrate; therefore the thickness is not restricted. The thickness of the second and third layers 54, 56 may be between 25 and 250 microns, and preferably between 25 and 125 microns. First and second sensing piezoresistors 62 and 64 are positioned on the third layer 56 opposite the output channels 42 and 44, respectively. Although the first and second sensing piezoresistors 62 and 64 are shown as positioned above the output channels 42 and 44, it should be understood that they may be positioned above the first and second diversion channels 18 and 20, respectively, or at a point in between, respectively. First and second reference piezoresistors 66 and 68 are positioned on a sensing area of the third layer 56 and disposed effectively displaced, set away, or otherwise positionally removed from the first and second sensing piezoresistors 62 and 64, respectively, such that mechanical deformation of the sensing area under first and second sensing piezoresistors 62 and 64 does not effectively actuate the resistance of the reference piezoresistors 66 and 68. A sensing area may include any surface or any portion of a surface capable of at least partial mechanical deflection or deformation so as to mechanically actuate the resistance value of a sensing piezoresistors 62 and 64 in correspondence to the mechanical deflection or deformation of the sensing area. In some embodiments, e.g., a multi-layer ceramic embodiment, the various elements may reside on different levels. For simplicity, the various components are shown in FIGS. 1 and 2 as being on the same level.

As the gas vapor passes through output channels 42 and 44, the pressure pulse is sufficient to trigger the sensing piezoresistors 62 and 64, thus generating an ac electrical signal indicative of the frequency of the oscillatory nature of the flow meter 12. The frequency of the gas shifting from one channel 18, 20 to the other is approximately linearly related to the volumetric flow For example, a cavity with single layer of tape ceramic provided as sensing membrane, or sensing area, may be formed in a multilayer ceramic structure using inter alia DuPont 943 GreenTape™ (available from DuPont Microcircuit Materials, E. I. Du Pont de Nemours and Company, 14 T. W. Alexander Drive, Research Triangle Park, N.C., USA), as representatively depicted in FIG. 2. Cofireable piezoresistive pastes such as, for example, 3414 series (available from Electro-Science Lab, 416 East Church Road, King of Prussia, Pa. 19406-2625, USA) may be used to form sensing resistors on the sensing membrane and reference resistors away from the sensing area. Discrete piezoresistive components may also be alternatively, conjunctively and/or sequentially employed.

Pressure or load sensing may be achieved through a resistor layout employing, for example, a Wheatstone bridge configuration. Operational tests have demonstrated pressure sensitivities on the order of about 1.3 mV/kPa for 1.6 mil thick ceramic membrane over a 200 mil square cavity.

Sensing resistors 62, 64 may be disposed on a sensing membrane surface while reference resistors 66, 68 may be positioned on a generally mechanically inactive surface of the third layer 56, as generally depicted, for example, in FIG. 2. Conductor pathways (not shown) may be externally accessed, for example, by typical multi-layer ceramic interconnection to surface I/Os.

In one exemplary embodiment, the utilization of cofireable piezoresistive paste and LTCC tape dielectric to form the piezoresistors 62, 64, 66, 68 would substantially reduce packaging cost. Moreover, the fluidic oscillation flow meter 10 could be easily integrated with other multi-layer ceramic functionalities to form multi-layer based Microsystems. Additionally, reference resistors 66, 68 may be cofired onto the bottom of the first layer, thus permitting a similar interface for all resistors inter alia to minimize the effect of resistance from piezoresistor/LTCC interaction.

Exploitation of the cofireability of piezoresistive paste and LTCC tape dielectric to form piezoresistors would effectively eliminate or otherwise reduce overall packaging cost. In another exemplary application, a pressure measurement may be obtained from an outlet region of an integrated device (down stream) to provide feedback to an actuation control system.

The fluidic oscillation flow meter 10 may be used most effectively in any application that consumes liquid fuel and operates at temperatures above the boiling point of that fuel, e.g., internal combustion engine, microreactors, and more specifically fuel cells. Fuel cells are electrochemical cells in which a free energy change resulting from a fuel oxidation reaction is converted into electrical energy. Reformed Hydrogen Fuel Cells (RHFCs) utilize hydrogen fuel processed from liquid or gaseous hydrocarbon fuels, such as methanol, using a reactor, called a fuel reformer, for converting the fuel into hydrogen. Methanol is the preferred fuel for use in fuel reformers for portable applications because it is easier to reform into hydrogen gas at a relatively low temperature compared to other hydrocarbon fuels such as ethanol, gasoline, or butane. The reforming or converting of methanol into hydrogen usually takes place by one of three different types of reforming. These three types are steam reforming, partial oxidation reforming, and autothermal reforming. Of these types, steam reforming is the preferred process for methanol reforming because it is the easiest to control and produces a higher concentration of hydrogen output by the reformer, at a lower temperature, thus lending itself to favored use.

Utilizing multilayer laminated ceramic technology, ceramic components and systems are now being developed for use in microfluidic chemical processing and energy management systems, e.g., fuel cells. Monolithic structures formed of these laminated ceramic components are inert and stable to chemical reactions and capable of tolerating high temperatures. These structures can also provide for miniaturized components, with a high degree of electrical and electronic circuitry or components embedded or integrated into the ceramic structure for system control and functionality. Additionally, the ceramic materials used to form ceramic components or devices, including microchanneled configurations, are considered to be excellent candidates for catalyst supports and so are extraordinarily compatible for use in microreactor devices for generating hydrogen used in conjunction with miniaturized fuel cells. An example of a fuel cell formed in a ceramic material is disclosed in U.S. Pat. No. 6,569,553.

Figure 3:
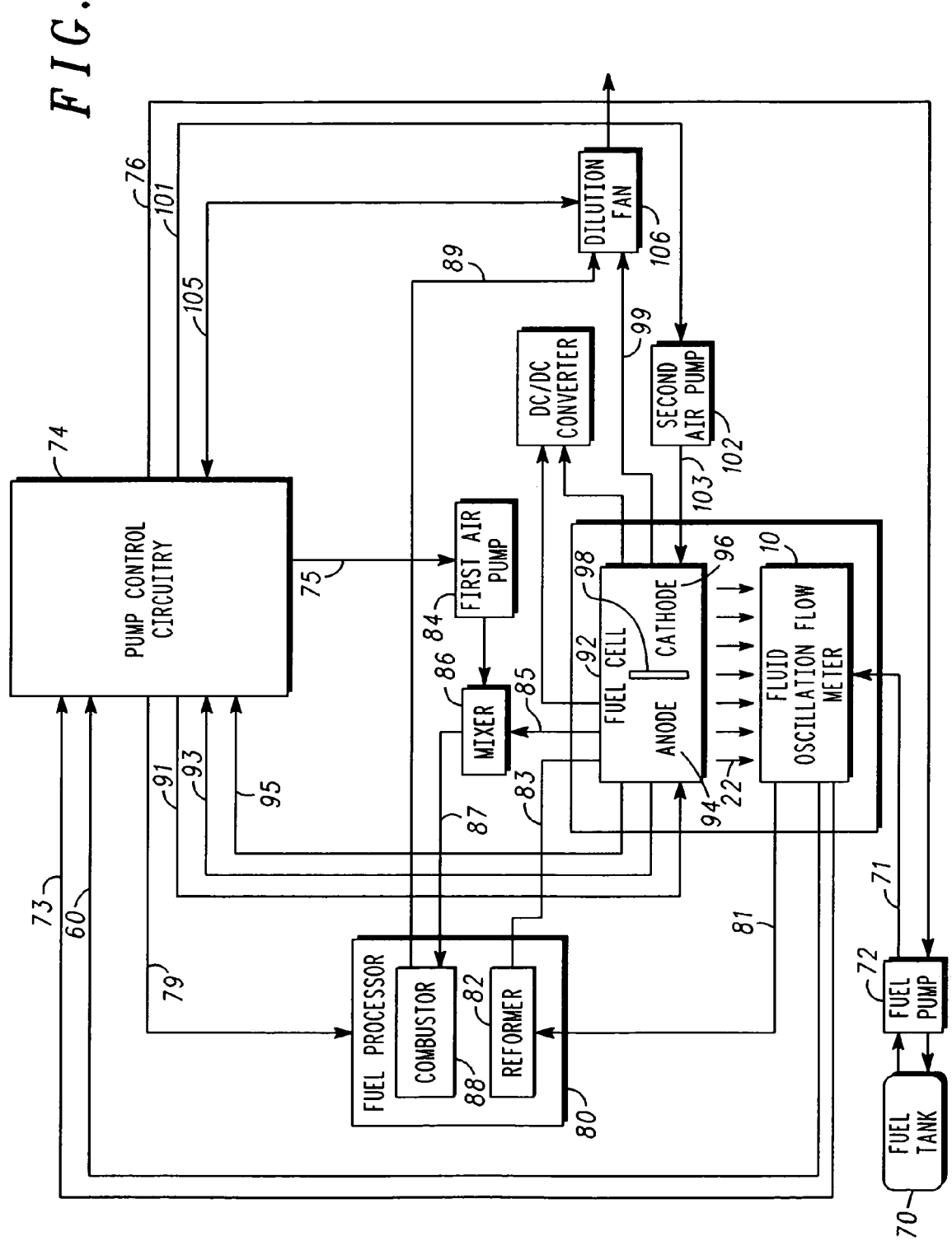
FIG. 3 is a block diagram of a fuel cell system including the fluidic oscillation flow meter of FIG. 1.

A simplified block diagram of a fuel cell system, including an exemplary embodiment of the fluidic oscillation flow meter 10, is shown in FIG. 3. A mixture 70 of methanol and water is supplied by a fuel pump 72 via fuel line 71 to the fluidic oscillation flow meter 10. The mixture 70 of methanol and water is converted to a gas vapor. Heat 22 is supplied to the fluidic oscillation flow meter 10 by the waste heat of a fuel cell 92 (an electric heater, not shown, may provide heat for startup). A frequency signal 60 is generated, as previously discussed, as well as a vapor temperature signal 73, and supplied to micro-controller 74. The micro-controller 74 forwards a control signal 76 to the fuel pump 72 for controlling the amount of fuel pumped in response to the frequency signal 60. Each frequency relates proportionally to a specific flow rate. The pump control circuitry 74 determines the flow rate based on the frequency signal 60 and the vapor temperature signal 73 and directs the fuel pump 72 via the control signal 76 to increase, decrease, or maintain the fuel flow rate.

The gas vapor exits the fluidic oscillation flow meter 10 via line 81 and enters a reformer section 82 of a fuel processor 80. A first air pump 84 pumps preferably air, though any oxidant could be used, to a mixer 86, for mixing the air with fuel received from the fuel cell 92 via line 85. The micro-controller 74 determines the speed of the flow rate of the first air pump 84 and controls the speed thereof with the combustor pump control signal 75. The mixture of air and fuel is fed via line 87 to a combustor 88 for supplying heat to the reformer 82. A heater control signal 79 from the micro-controller 74 to the combustor 88 controls the amount of heat generated by the combustor 88 for optimum operation of the reformer 82. The reformer supplies hydrogen vapor via line 83 to the anode 72 of the fuel cell 92.

The fuel cell 92 comprises a fuel electrode, or anode 94, and an oxidant electrode, or cathode 96, separated by an ion-conducting electrolyte 98. The electrodes 94, 96 are connected electrically to a load (such as an electronic circuit) by an external circuit conductor (not shown). In the circuit conductor, electric current is transported by the flow of electrons, whereas in the electrolyte 98, it is transported by the flow of ions, such as the hydrogen ion ($H^+$) in acid electrolytes, or the hydroxyl ion ($OH^-$) in alkaline electrolytes. In theory, any substance capable of chemical oxidation that can be supplied continuously (as a gas or fluid) can be oxidized galvanically as the fuel at the anode of a fuel cell. Similarly, the oxidant, supplied via line 103 by second air pump 102, can be any material that can be reduced at a sufficient rate. Gaseous hydrogen has become the fuel of choice for most applications, because of its high reactivity in the presence of suitable catalysts and because of its high power density. Similarly, at the fuel cell cathode 96, the most common oxidant is gaseous oxygen, which is readily and economically available from air for fuel cells used in terrestrial applications. When gaseous hydrogen and oxygen are used as fuel and oxidant, the electrodes 94, 96 are porous to permit the gas-electrolyte junction area to be as great as possible. The electrodes 94, 96 must be electronic conductors, and possess the appropriate reactivity to give significant reaction rates. At the anode 94, incoming hydrogen gas is oxidized to produce hydrogen ions (protons) and electrons. Since the electrolyte is a non-electronic conductor, the electrons flow away from the anode 94 via an external electrical circuit. At the cathode 96, oxygen gas is reduced and reacts with the hydrogen ions migrating through the electrolyte 98 and the incoming electrons from the external circuit to produce water as a byproduct. The byproduct water is typically expelled as vapor at elevated temperatures via line 99. The overall reaction that takes place in the fuel cell is the sum of the anode 94 and cathode 96 reactions, with part of the free energy of reaction released directly as electrical energy. The difference between this available free energy and the heat of reaction is produced as heat at the temperature of the fuel cell 92. It can be seen that as long as hydrogen and oxygen are supplied to the fuel cell 92, the flow of electric current will be sustained by electronic flow in the external circuit and ionic flow in the electrolyte.

In practice, a number of these unit fuel cells 92 are normally stacked or 'ganged' together to form a fuel cell assembly. A number of individual cells are electrically connected in series by abutting the anode current collector of one cell with the cathode current collector of its nearest neighbor in the stack.

The micro-controller 74 controls the overall operation of the system. For example, the operating point of the fuel cell 92 is controlled by a heater control signal 91 from the micro-controller 74 in response to a temperature signal 93 and a cell voltage signal 95 from the fuel cell 92. The amount of oxidant supplied to the cathode 96 by the second air pump 102 is controlled by the cathode blower signal 101 from the micro-controller. Exhaust from the fuel cell 92 via line 99 through dilution fan 106 is controlled by the micro-processor 74 via dilution fan signal 105. A DC-DC converter 108 receives electrical current produced by the fuel cell 92 and provides power to the micro-controller 74.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A fluidic oscillation flow meter comprising:
 a housing defining:
  an inlet for receiving a fluid; and
  first and second diversion channels for alternatively receiving the fluid from the inlet;
 the housing comprising:
  a first nozzle for receiving the fluid from the first diversion channel and deflecting the fluid from the inlet into the second diversion channel;
  a second nozzle for receiving the fluid from the second diversion channel and deflecting the fluid from the inlet into the first diversion channel; and
  a layer of material adjacent the first diversion channel including a first sensing area that distorts due to a pressure change caused by the fluid flowing through the first diversion channel;
 a first sensing piezoresistor positioned on the layer of material near the first diversion channel for detecting the pressure change of the first sensing area;
 a first reference piezoresistor positioned on the layer of material and effectively removed from said sensing area such that mechanical deformation of said first sensing area does not substantially actuate the resistance of the reference piezoresistor, the reference piezoresistor coupled to the first sensing piezoresistor for generating a frequency signal; and
 an outlet for purging the fluid.

2. The fluidic oscillation flow meter of claim 1 wherein the
 layer of material adjacent the second diversion channel includes a second sensing area that distorts due to a pressure change caused by the fluid flowing through the second diversion channel;
 the fluidic oscillation flow meter further comprising a second sensing piezoresistor positioned on the layer of material near the second diversion channel for detecting the pressure change of the second sensing area; and
 a second reference piezoresistor positioned on the layer of material and effectively removed from said second sensing area such that mechanical deformation of said second sensing area does not substantially actuate the resistance of the second reference piezoresistor, the second the reference piezoresistor coupled to the second sensing piezoresistor for generating the frequency signal.

3. The fluidic oscillation flow meter of claim 2 wherein the first and second sensing piezoresistors and the first and second reference piezoresistors comprise a Wheatstone bridge configuration of conductive connection therebetween.

4. The fluidic oscillation flow meter of claim 1 further comprising:
   a fuel processor for receiving the fluid from the fluidic oscillation flow meter;
   a fuel cell receiving reformed hydrogen from the fuel processor; and
   a fuel pump pumping the fluid to the fluidic oscillation flow meter at a flow determined in response to the frequency signal.

5. The fluidic oscillation flow meter of claim 1 wherein the housing comprises at least one of ceramic, glass, polymer material, metal, and a metal alloy.

6. An apparatus including a fluidic oscillation flow meter, comprising:
   a housing; and
   the fluidic oscillation flow meter formed within the housing, the fluidic oscillation flow meter including:
      an inlet for receiving the fluid;
      first and second diversion channels for alternatively receiving the fluid from the inlet;
      a first nozzle for receiving the fluid from the first diversion channel and deflecting the fluid from the inlet into the second diversion channel;
      a second nozzle for receiving the fluid from the second diversion channel and deflecting the fluid from the inlet into the first diversion channel;
      a first piezoresistor positioned near the first diversion channel for detecting the movement of the fluid;
      a first reference piezoresistor effectively removed from the first diversion channel as to not substantially actuate the resistance of the reference piezoresistor; the first reference piezoresistor coupled to the first sensing piezoresistor for generating the frequency signal; and
      an outlet for the fluid.

7. The apparatus of claim 6 wherein the fluidic oscillation flow meter further comprises:
   a second sensing piezoresistor positioned near the second diversion channel for detecting the movement of the fluid; and
   a second reference piezoresistor effectively removed from the second diversion channel as to not substantially actuate the resistance of the reference piezoresistor, the second reference piezoresistor coupled to the second sensing piezoresistor for generating the frequency signal.

8. The apparatus of claim 6 further comprising:
   a fuel processor for receiving the fluid from the fluidic oscillation flow meter;
   a fuel cell receiving reformed hydrogen from the fuel processor; and
   a fuel pump pumping the fluid to the fluidic oscillation flow meter at a flow determined in response to the frequency signal.

9. The apparatus of claim 6 wherein the first and second sensing piezoresistors and the first and second piezoresistors comprise a Wheatstone bridge configuration of conductive connection therebetween.

10. The apparatus of claim 6 wherein the housing comprises at least one of ceramic, glass, polymer material, metal, and a metal alloy.

11. A fluidic oscillation flow meter comprising:
   a housing forming:
      an inlet for receiving a fluid;
      first and second diversion channels for alternatively receiving the fluid flow from the inlet, each of the first and second diversion channels having a wall formed of a material;
      a first nozzle for receiving the fluid from the first diversion channel;
      a second nozzle for receiving the fluid from the second diversion channel; wherein the first and second nozzles alternatively deflect the gas vapor flow from the inlet into the second and first diversion channels, respectively; and
      at least one outlet for the gas vapor;
   a first sensing piezoresistor positioned on the material opposed to the wall of the first diversion channel for detecting movement of the fluid; and
   a first reference piezoresistor positioned on the material and effectively removed from the first diversion channel such that mechanical deformation of material does not substantially actuate the resistance of the first reference piezoresistor, the first reference piezoresistor coupled to the first sensing piezoresistor for generating a frequency signal.

12. The fluidic oscillation flow meter of claim 11 further comprising:
   a second sensing piezoresistor positioned on the material opposed to the wall of the second diversion channel for detecting movement of the fluid; and
   a second reference piezoresistor positioned on the material and effectively removed from the second diversion channel such that mechanical deformation of material does not substantially actuate the resistance of the second reference piezoresistor, the second reference piezoresistor coupled to the second sensing piezoresistor for generating the frequency signal.

13. The fluidic oscillation flow meter of claim 12 wherein the first and second sensing piezoresistors and the first and second piezoresistors comprise a Wheatstone bridge configuration of conductive connection therebetween.

14. The fluidic oscillation flow meter of claim 11 further comprising:
   a fuel processor for receiving the fluid from the fluidic oscillation flow meter;
   a fuel cell receiving reformed hydrogen from the fuel processor; and
   a fuel pump pumping the fluid to the fluidic oscillation flow meter at a flow determined in response to the frequency signal.

15. The fluidic oscillation flow meter of claim 11 wherein the housing comprises at least one of ceramic, glass, polymer material, metal, and a metal alloy.

16. A method of sensing the rate of flow of a fluid in an apparatus that consumes a fluid, the apparatus including a substrate comprising an inlet, first and second nozzles, a first diversion channel coupled between the inlet and the first nozzle, a second diversion channel coupled between the inlet and the second nozzle, a first sensing piezoresistor positioned near the first diversion channel, and a first reference piezoresistor distally disposed from the first sensing piezoresistor, the method comprising:
   receiving a stream of the fluid through the inlet;
   directing the stream into the first diversion channel;

sensing the stream in the first diversion channel by the first sensing piezoresistor;

comparing a first sensing signal from the first sensing piezoresistor with a first reference signal from the first reference piezoresistor;

generating a first output signal from the first sensing signal and first reference signal;

passing the fluid through the first nozzle;

impacting the fluid from the first nozzle onto the stream;

diverting the stream into the second diversion channel;

passing the fluid through the second nozzle;

impacting the fluid from the second nozzle onto the stream;

diverting the steam into the second diversion channel;

repeating the sensing, comparing, and generating steps; and calculating the rate of flow of the fluid based on the first output signal.

17. The method of claim 16 further comprising:

sensing the stream in the second diversion channel by the second sensing piezoresistor;

comparing a second sensing signal from the second sensing piezoresistor with a second reference signal from the second reference piezoresistor;

generating a second output signal from the first sensing signal, the first reference signal, the second sensing signal, and the second reference signal; and calculating the rate of flow of the fluid based on the first and second output signal.

* * * * *